Sept. 9, 1958  L. D. COBB  2,850,792
METHOD OF APPLYING A BEARING SEAL
Filed March 23, 1954
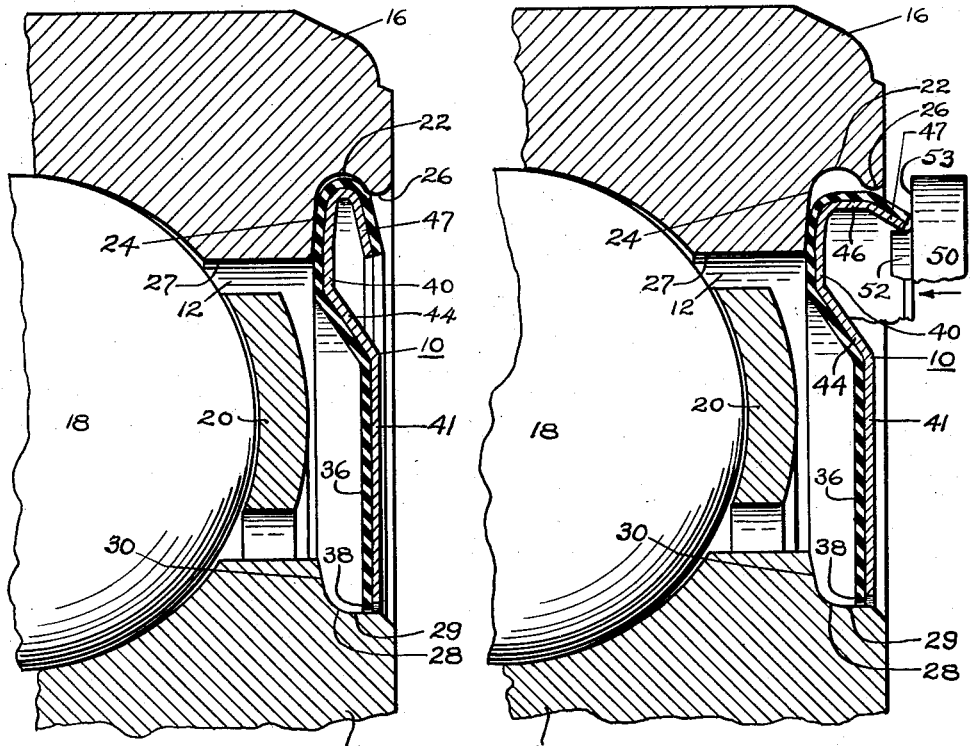
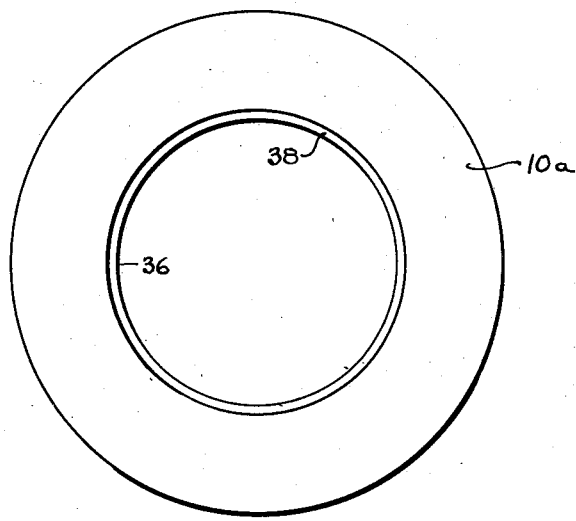
INVENTOR
LELAND D. COBB
BY Edward H. Goodrich
HIS ATTORNEY.

United States Patent Office 2,850,792
Patented Sept. 9, 1958

2,850,792

METHOD OF APPLYING A BEARING SEAL

Leland D. Cobb, Forestville, Conn., assignor to General Motors Corporation, Detroit, Mich., a corporation of Delaware Application March 23, 1954, Serial No. 418,031

3 Claims. (Cl. 29—148.4)

This invention relates to bearings and particularly to a bearing closure and method for closing the space between a pair of relatively rotatable annular bearing members to maintain lubricant within the bearing and prevent the entrance of dirt and other deleterious material into the bearing.

Heretofore, end closures for bearings have been provided with a folded-over metal rim that is radially expanded into tightly wedged seating engagement against the walls and bottom of a groove formed in one of the race rings of an antifriction bearing. To accomplish satisfactory fitting relation, this wedged engagement is often sufficient to distort the bearing causing an out of round condition which results in bearing damage with consequent short bearing life. Furthermore, this bearing distortion defeats the purpose of the meticulous manufacturing of the bearing parts which must interfit within extremely close limits of accuracy to provide a precision bearing having a long reliable life. Additionally, this wedged mounting of the metal rim of a bearing shield often results in shield distortion making an unsatisfactory closure which permits lubricant leakage and frequently impedes bearing operation. Hence, many precision manufactured antifriction bearings are made unsatisfactory by the installation of such a metal shield which is folded over into tightly wedged engagement against a race ring.

An object of this invention is to provide an improved closure of simple inexpensive construction and which may be easily assembled with one of a pair of relatively rotatable members ot close the space therebetween.

Another object is to provide for the end of an antifriction bearing an improved closure that retains lubricant within the bearing and which is deformably and sealingly received in unit-handling relation with the bearing without imparting distorting stresses to the bearing.

Another object is to provide for a bearing a laminated stamped out end closure expanded into yieldably seated sealing engagement with a bearing member and extending across an annular lubricant chamber of the bearing.

Another object resides in the provision of an improved method for making and installing a closure across the annular space between a pair of relatively rotatable members.

To these ends and also to improve generally upon devices and methods of this character, this invention consists in the various matters hereinafter described and claimed. In its broader aspects, the invention is not necessarily limited to the specific examples set forth for purposes of illustration wherein:

Figure 1 is a fragmentary cross section of an antifriction bearing having my improved end closure;

Figure 2 is a fragmentary cross section of an antifriction bearing showing the method of assembly of the end closure with the bearing; and Figure 3 is a side elevation of my closure before being bent to form for installation.

My improved closure washer or shield 10 is mounted in closing relation across the end of an annular lubricant chamber 12 between a pair of relatively rotatable members, as the inner and outer race rings 14 and 16 of an antifriction bearing, these race rings being provided with the usual raceways which receive rolling elements, as balls 18, guided by a separator 20. One or both ends of one of the race rings, as 16, is respectively provided with an annular groove 22 that is transversely curved between an annularly extending generally radially disposed shoulder 24 and a transversely rounded annularly extending land 26. The diameter of this land 26 is intermediate between that of the bottom of the groove 22 and that of an inner cylindrical periphery 27 of the race ring. The other race ring, as 14, preferably has at its end an annularly extending notch 28 generally opposed to the groove 22, this notch being illustrated with a substantially cylindrical bottom wall 29 and a sloping side wall 30 which acts as a slinger to urge lubricant back into the bearing.

The closure or shield members 10 which extend across the annular lubricant chamber 12 are each stamped out from sheet material into the form of a flat disc 10a having a stepped inner bore arranged to fit in closely spaced relation over the cylindrical wall 29 and having an outer diameter exceeding that of the bottom of the groove 22. Each of these discs comprises a flat sheet metal ring to one side of which is bonded a sheet or coating 36 of resilient rubber-like material which will not deteriorate or lose its resiliency in the presence of heat, light and lubricants. This rubber-like material may be composed of a suitable synthetic rubber latex that is sprayed or flowed onto one side of a metal sheet in the presence of a bonding agent and thereafter vulcanized in position to provide a laminated shield of sheet metal with a resiliently yieldable coating 36 wherein this rubber-like coating is securely bonded to the sheet metal. If preferred, a sheet of rubber-like material may be placed on one side of the metal sheet and bonded or vulcanized thereto. The flat discs 10a are stamped out from this metal sheet having the rubber-like resilient coating 36. One suitable material for this sheet or coating 36 may comprise a resilient synthetic rubber containing a polymerization product of butadiene and acrylic nitrile. The die employed for stamping out the disc 10a preferably cuts through this rubber-coated strip of sheet metal from its rubber coated side. Due to the inherent resiliency of the rubber-like coating 36, this coating will compress under pressure of the die and radially deform away from the die before the die cuts through this rubber coating and thereafter through the sheet metal. As a result, when the die is withdrawn, the rubber coating resiliently returns to its uncompressed condition leaving a bore through the coating 36 of smaller diameter than that through the sheet metal thus providing a deformably resilient annular lip 38 radially projecting inwardly beyond the inner annular edge of the sheet metal disc.

To increase lubricant capacity in the bearing and to also stiffen the closure 10, I have provided an annular dished portion herein illustrated as generally radially disposed walls 40 and 41 in laterally offset relation and interconnected by an intermediate frusto-conical portion 44. The outer periphery of the wall 40 is laterally bent over to provide a rim having a generally cylindrical portion 46 merging at its outer end with a frusto-conical lip 47 bent slightly radially inwardly. The cylindrical portion 46 has a diameter such that its outer rubber-coated periphery may be slidably entered within the annular land 26 with the resilient coating of the wall 40 locating against the shoulder 24 as shown in Figure 2.

During assembly with the closure member 10 in the position of Figure 2, a ram 50, suitably positioned coaxially of the bearing, has an annular lip 52 piloted within the lip 47 and a radial shoulder 53 located in abutting relation to the end of this lip 47. The ram is axially forced inwardly towards the bearing causing the cylindrical portion 46 to fold radially outwardly into interfitting relation with the groove 22 and causing the lip 47 to fold radially inwardly into spaced relation with the wall 40 as shown in Figure 1. The lip 47 is preferably folded inwardly towards the wall 40 sufficiently to cause the resilient rubber-like coating 36 to firmly and sealingly engage the shoulder 24 and sides of the groove 22 under slightly compressed deformation without completely bottoming in the groove. With this arrangement, the closure member 10 is permanently and securely mounted in unit-handling relation with the bearing. Also the resiliently deformable coating 36 avoids any tendency to distort a bearing race ring as has often occurred when a metal ring has been expanded into a race ring groove. The yieldable lip 38 is shown in slight clearance relation to the rotatable cylindrical inner race ring surface 29, but it should be understood that my invention also contemplates a lightly wiping sealing engagement of this resilient lip 38 either against the surface 29 or against a sloping side wall of the annular notch 28.

I claim:

1. The method of closing the end of an annular lubricant chamber between a pair of relatively rotatable members comprising the steps of coating a metal sheet with deformably resilient rubber-like material, stamping out an annular disc from the coated sheet, folding back a peripheral portion of the disc to form an annularly disposed lateral projection externally coated with said resilient rubber-like material, inserting the coated disc between the rotatable members, and folding said lateral projection back towards the body of the disc to deformably compress the resilient material about said peripheral portion in yieldable sealing engagement with one of the relatively rotatable members.

2. The method of closing the end of an annular lubricant chamber between a pair of relatively rotatable bearing members one of which has an annular groove opening towards the other member, comprising the steps of bonding to one side of a metal sheet a uniform coating of deformably resilient rubber-like material, stamping out of the coated sheet a disc having a stepped bore, said bore being of a smaller diameter through the resilient coating than the bore diameter through the metal sheet, bending back the disc periphery to provide on the disc an annularly extending lateral projection surrounded by said resilient coating, inserting the disc across the annular lubricant chamber between the bearing members, and folding back the lateral projection towards said disc to deform its periphery into non-bottoming resiliently seated sealing engagement within said groove.

3. The method of closing the end of an annular lubricant chamber between a pair of relatively rotatable bearing members respectively provided with an annular groove and with an annular notch opening toward each other comprising the steps of providing a metal sheet, permanently bonding a rubber-like resilient coating to one side of the metal sheet, stamping out of the coated sheet an annular disc having a stepped bore with a resilient lip radially extending beyond the metal sheet to a diameter close to that of said notch and said disc having an outer diameter exceeding that of the bottom of said groove, laterally deforming an intermediate portion of the disc to a generally dished form, bending back the disc periphery to provide a laterally projecting annular rim surrounded by said rubber-like coating, and bending back the rim towards the disc causing the rim to expand into non-bottoming relation in the groove with said rubber-like coating deformably and resiliently seated in sealing relation against the side walls of said groove.

References Cited in the file of this patent

UNITED STATES PATENTS

| 1,917,987 | Large | July 11, 1933 |
| 2,120,461 | Copeman | June 14, 1938 |
| 2,122,537 | Pfeffer | July 5, 1938 |
| 2,355,805 | Koepp | Aug. 15, 1944 |
| 2,467,049 | Peterson | Apr. 12, 1949 |
| 2,734,757 | Martin | Feb. 14, 1956 |

FOREIGN PATENTS

| 851,424 | France | Oct. 2, 1939 |
| 581,232 | Great Britain | Oct. 4, 1946 |